United States Patent Office 3,058,974
Patented Oct. 16, 1962

3,058,974
AZO-DYESTUFFS INSOLUBLE IN WATER
Ulrich Dreyer, Offenbach-Burgel, and Werner Kirst, Offenbach (Main), Germany, assignors to Farbwerke Hoechst Aktiengesellschaft vormals Meister Lucius & Brüning, Frankfurt am Main, Germany, a corporation of Germany
No Drawing. Filed July 13, 1959, Ser. No. 826,461
Claims priority, application Germany July 18, 1958
7 Claims. (Cl. 260—147)

The present invention relates to new azo-dyestuffs insoluble in water and to a process for preparing the same; more particularly it relates to complex metal compounds of water-insoluble azo-dyestuffs corresponding to the general formula

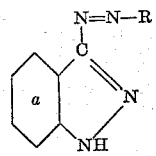

in which the benzene nucleus a may be substituted by halogen atoms, alkyl, alkoxy, aryloxy, acyloxy, nitro, trifluoromethyl, carboxylic acid ester, carboxylic acid amide groups which may contain substituents, acyl, alkylsulfonyl, arylsulfonyl, sulfonic acid ester, sulfonic acid amide groups which may contain substituents, acylamino or arylamino groups, and R represents the radical of an arylamide of an aromatic or heterocyclic o-hydroxycarboxylic acid or acyl-acetic acid free from groups imparting solubility in water.

We have found that valuable new azo-dyestuffs insoluble in water can be obtained by coupling in substance, on the fiber or on another substratum a diazonium compound of an amine of the general formula

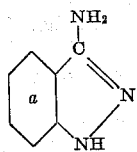

in which the benzene nucleus a may be substituted by halogen atoms, alkyl, alkoxy, aryloxy, acyloxy, nitro, trifluoromethyl, carboxylic acid ester, carboxylic acid amide groups which may contain substituents, acyl, alkylsulfonyl, arylsulfonyl, sulfonic acid ester, sulfonic acid amide groups which may contain substituents, acylamino or arylamino groups, with an arylamide of an aromatic or heterocyclic o-hydroxycarboxylic acid or acylacetic acid free from groups imparting solubility in water, for example sulfonic acid or carboxylic acid groups, and treating the dyestuff so obtained with an agent yielding metal.

The water-insoluble azo-dyestuffs obtainable by the present invention can be treated after the coupling with the agents yielding metal in known manner in substance or on the fiber. When the dyestuffs are produced on the fiber, it is, however, of advantage to add the agents yielding metal to the dyebath and to carry out the metallization of the dyestuffs during the coupling. This can be effected without difficulty, since the diazo solutions prepared from the amines used in the process of the invention are in many cases very stable to agents yielding metal even at high temperatures. As agents yielding metal there may be used, for example, iron, chromium, uranium, manganese, aluminum, lead, cadmium or zinc, and preferably cobalt, copper and nickel, which may be used in the form of their organic or inorganic salts or in the form of complex compounds.

The new dyestuffs yield on vegetable fibers including those of regenerated cellulose, according to the dyeing and printing processes known from the ice color industry, dyeings of good fastness properties. The green, violet, blue and blue-green dyestuffs obtainable with the cobalt, nickel or copper compounds possess a very good fastness to light and are especially valuable. When a loose material, hanks or a wound-up material is used, the dyestuffs can be produced on vegetable fibers in a long goods-to-liquor ratio, while piece-goods can be dyed in a continuous manner or according to the methods of base printing. Dyeings on piece-goods of vegetable fibers can in part be discharged to a pure white and, furthermore, they can be reserved in known manner, for example, with the use of phenylhydrazine-para-sulfonic acid.

The dyestuffs of this invention can also be produced on animal fibers, such as wool or silk, or on hides and furs, valuable dyeings of good fastness properties being likewise obtained.

The dyestuffs may also be prepared in substance and converted into the complex metal compounds by treating them with agents yielding metal. The metallization is advantageously carried out in organic solvents, such as acetone or dimethylformamide, in the presence of small quantities of pyridine. The complex metal compounds so obtained have a great tinctorial strength. They are in general soluble in acetone, alcohol or nitrocellulose ester lacquers so that they can be used for the preparation of colored paints. Furthermore, the complex metal compounds prepared in substance may be used for dyeing animal fibers, such as wool or silk, or synthetic fibers, for example polyamide, polyurethane, acetyl cellulose or polyester fibers, or for coloring high molecular plastic masses.

As coupling components there may be used in the process of the invention arylamides of aromatic or heterocyclic o-hydroxycarboxylic acids or acylacetic acids, for example arylamides of 2,3-hydroxynaphthoic acid or its derivatives substituted in 6-position, of 2-hydroxyanthracene-3-carboxylic acid, of cresotic acids, of halogen-salicyclic acids, of 4-hydroxydiphenyl-3-carboxylic acid, of 2-hydroxycarbazole-3-carboxylic acid, of 5-hydroxy-1,2,1',2'-benzocarbazole-4-carboxylic acid, of 3-hydroxydiphenylene oxide-2-carboxylic acid, of 3-hydroxydiphenylene sulfide-2-carboxylic acid, of aceto acetic acid, of benzoyl acetic acid or terephthaloyl-bis-acetic acid.

As amino compounds which correspond to the above formula and may advantageously be used in the process of the invention there may be mentioned, for example, 3-amino-indazol, 3-amino-4-chloro-indazol, 3-amino-5-chloro-indazol, 3-amino-6-chloro-indazol, 3-amino-6-methylindazol, 3-amino-5-methoxyindazol, 3-amino-5-methoxy-6-chloro-indazol, 3-amino-6-methoxyindazol or 3-amino-6-ethoxyindazol.

These amino compounds, only a part of which has been described in the literature, can be prepared by known methods, for example by diazotizing o-amino-benzonitriles, reducing the diazo compounds with stannous chloride and hydrochloric acid to obtain the hydrazine compounds and cyclization in an acid medium to the 3-aminoindazols. The compounds so obtained are stable and well crystallizing products which can be diazotized in known manner in a mineral acid solution. When the diazo solutions are neutralized, the diazo compounds separate in the form of difficultly soluble, stable anhydroindazol-3-diazo-hydroxides.

The new dyestuffs are superior to the water-insoluble azo-dyestuffs disclosed in French Patent 981,432 and obtainable by coupling diazotized 6- or 7-amino-indazol with an arylamide of 2,3-hydroxynaphthoic acid and subsequent metallization with regard to the properties of fastness.

The following examples serve to illustrate the invention but they are not intended to limit it thereto.

Example 1

Cotton yarn is treated for 30 minutes at a goods-to-liquor ratio of 1:20 in the following bath:

3 grams of 1-(2′,3′-hydroxynaphthoylamino)-2-methoxybenzene are dissolved in
3 cc. of denatured ethyl alcohol,
1.5 cc. of sodium hydroxide solution of 38° Bé.,
1.5 cc. of a formaldehyde solution of 30% strength and
3 cc. of warm water and the solution is then made up to 1 liter with water at 35° C.,
3 cc. of the sodium salt of sulfonated castor oil of 50% strength,
5 cc. of sodium hydroxide solution of 38° Bé. and
30 grams of sodium chloride.

The material is then squeezed off and treated for 30 minutes in the following bath:

1.67 grams of 3-amino-5-chloro-indazol (melting at 161 to 162° C.) are dissolved in
4.1 cc. of hydrochloric acid of 20° Bé. and a small quantity of warm water. The solution is then cooled by the addition of ice, and
4 cc. of a sodium nitrite solution of 20% strength are added. When the diazotization is complete, the bath is diluted to about 800 cc. with lukewarm water,
1.4 grams of sodium formate and
20 grams of sodium chloride, dissolved in about 100 cc. of water, are then added and the solution is made up to 1 liter with water. The claret dyeing so obtained is rinsed and then treated for 30 minutes in a bath containing, per liter of water, 3 grams of cobaltous cloride and 2 cc. of acetic acid of 50% strength, while raising the temperature to about 90° C. During this procedure the tint turns green. The material is then soaped at the boil with a solution containing, per liter of water, 3 grams of soap and 3 grams of sodium carbonate, rinsed again and dried.

A full, dark green dyeing of very good fastness to light and to wet processing is obtained.

Example 2

Cotton fabric is padded on a two-roller foulard with the following solution:

13.4 grams of 1-(2′,3′-hydroxynaphthoylamino)-2-methylbenzene are dissolved in
20 cc. of diglycol,
30 cc. of the sodium salt of sulfonated castor oil of 50% strength and
16.7 cc. of sodium hydroxide solution of 38° Bé. and the solution is made up to 1 liter with water at 90° C.

The dried fabric is then developed at a goods-to-liquor ration of 1:20 with a diazo solution prepared from 1.67 grams of 3-amino-5-chloro-indazol as described in Example 1. The material is then rinsed and treated for 30 minutes, while heating to about 90° C., in a bath containing, per liter of water, 3 grams of nickel sulfate and 2 cc. of acetic acid of 50% strength, rinsed, soaped at the boil with a solution containing, per liter of water, 3 grams of soap and 3 grams of sodium carbonate, rinsed again and dried.

A full violet dyeing of very good fastness to light and to wet processing is obtained.

When, instead of 3 grams of nickel sulfate, 2 grams of copper sulfate are used for the metallization, a dark grey dyeing of very good fastness properties is obtained.

Example 3

Cotton fabric is padded on a two-roller foulard with the following solution:

6.48 grams of 1-(2′,3′-hydroxynaphthoylamino)-2,4-dimethoxy-5-chlorobenzene are dissolved in
10 cc. of diglycol,
30 cc. of the sodium salt of sulfonated castor oil of 50% strength and
13.2 cc. of sodium hydroxide solution of 38° Bé. and the solution is made up to 1 liter with water at 90° C.

The dried material is developed at a goods-to-liquor ratio of 1:20 with a diazo solution which has been prepared as follows:

0.46 gram of 3-amino-6-methoxyindazol (melting at 202–203° C.), dissolved in
1.15 cc. of hydrochloric acid of 20° Bé. and a small amount of warm water, are diazotized with
1.13 cc. of a sodium nitrite solution of 20% strength,
0.55 gram of sodium formate,
0.5 cc. of formic acid and a solution of
2 grams of cobaltous chloride in a small amount of water are subsequently added. The solution is then made up to 1 liter with water at 35° C.

When the material has been introduced, the temperature is slowly raised to 60° C. and after about 15 minutes to 90° C. The material is then rinsed, soaped at the boil with a solution containing, per liter of water, 3 grams of soap and 3 grams of sodium carbonate, rinsed again and dried.

A bright green dyeing of very good fastness to light and to wet processing is obtained.

When, instead of 2 grams of cobaltous chloride, 2 grams of nickel sulfate are used in the developing bath, a violet dyeing of likewise good fastness properties is obtained.

Example 4

Cotton fabric is padded on a two-roller foulard with a solution containing per liter of hot water 12.8 grams of 2,3-hydroxynaphthoylaminobenzene,
30 cc. of the sodium salt of sulfonated castor oil of 50% strength and
19.2 cc. of sodium hydroxide solution of 38° Bé.

The dried fabric is printed with the following paste:

8.2 grams of 3-amino-6-methoxyindazol are diazotized with
21 cc. of hydrochloric acid of 20° Bé. and
20 cc. of a sodium nitrite solution of 20% strength. The diazo solution is stirred into
500 grams of carboxy-methylcellulose thickening of 8% strength which has been mixed with
7.3 grams of sodium acetate and
8.2 grams of cobaltous chloride, dissolved in a small amount of water, and the paste is then made up to 1 kilogram with water.

The material is then dried at about 80° C., treated with a boiling solution containing, per liter of water, 10 cc. of acetic acid of 50% strength, thoroughly rinsed, soaped at the boil with a solution containing, per liter of water, 3 grams of soap and 3 grams of sodium carbonate and dried.

A green print on a white ground is obtained.

Alternatively, the fabric may be steamed neutral or acid after printing and drying, whereby the depth of the tint in increased.

Example 5

Cotton yarn is treated at a goods-to-liquor ratio of 1:20 in the following bath:

1.2 grams of 1-(2′,3′-hydroxynaphthoylamino)-2,4-dimethoxy-5-chlorobenzene are dissolved in
3.6 cc. of denatured ethyl alcohol,
0.6 cc. of a formaldehyde solution of 30% strength and
1.2 cc. of hot water and the solution is made up to 1 liter with water at 35° C.,
6 cc. of sodium hydroxide solution of 38° Bé.,
5 cc. of the sodium salt of sulfonated castor oil of 50% strength and
20 grams of sodium chloride.

After 30 minutes, the yarn is centrifuged and developed in the following bath:

0.8 gram of 3-amino-indazol in the form of its diazonium compound is made into a paste with an aqueous solution of
1 cc. of a reaction product from ethylene oxide and a fat alcohol and
0.85 cc. of hydrochloric acid of 20° Bé. and dissolved in water at 60° C. The solution is mixed with
2.5 cc. of acetic acid of 50% strength,
0.85 gram of sodium acetate and
20 grams of sodium chloride and made up to 1 liter with warm water.

The material is introduced at about 60° C., a bluish red dyeing being obtained. After a short time 2.8 grams of cobaltous chloride dissolved in a small quantity of water are added and the temperature is slowly raised to 90° C. The tint then turns green. After about 30 minutes, the yarn is rinsed, soaped at the boil with a solution containing, per liter of water, 3 grams of soap and 3 grams of sodium carbonate, rinsed again and dried.

A medium green dyeing of very good fastness to light and to washing is obtained.

When in the above example 3.2 grams of nickel sulfate are used instead of 2.8 grams of cobaltous chloride, a violet dyeing is obtained. When the cobaltous chloride is replaced by 3 grams of copper sulfate, a blue-green dyeing is obtained. The dyeings likewise possess good fastness properties.

Example 6

Cotton yarn is treated for 30 minutes at a goods-to-liquor ratio of 1:2 in the following bath:

0.9 gram of 1-(2',3'-hydroxynaphthoylamino)-2-methoxy-4-chloro-5-methylbenzene is dissolved in
1.8 cc. of denatured alcohol,
1.45 cc. of sodium hydroxide solution at 38° Bé.,
0.9 cc. of a formaldehyde solution of 30% strength and
0.9 cc. of hot water and the solution is made up to 1 liter with water at 35° C.,
3 grams of the sodium salt of sulfonated castor oil of 50% strength,
6 cc. of sodium hydroxide solution of 38° Bé., and
20 grams of sodium chloride.

The yarn is centrifuged and developed in the following bath:

0.8 gram of 3-amino-6-chloro-indazol (melting at 220 to 222° C.) in the form of the diazonium compound is made into a paste with an aqueous solution of
1 cc. of a reaction product from ethylene oxide and a fat alcohol and
0.85 cc. of hydrochloric acid of 20° Bé. and dissolved in water at about 60° C. To this solution are then added
2.5 cc. of acetic acid of 50% strength,
0.85 gram of sodium acetate and
20 grams of sodium chloride and the bath is made up to 1 liter with water at 60° C.

The yarn is treated for about 15 minutes at 60 to 70° C. An aqueous solution of 2.8 grams of cobaltous chloride is then added, the bath is heated to 90° C. and the treatment is continued for about 30 minutes at this temperature. The material is then thoroughly rinsed, aftertreated at the boil with a solution containing, per liter of water, 3 grams of soap and 3 grams of sodium carbonate, rinsed again and dried.

An olive green dyeing of very good fastness to light is obtained.

When in the above example 3 grams of copper sulfate are used instead of 2.8 grams of cobaltous chloride, a blue-green dyeing of very good fastness to light is obtained.

Example 7

Cotton yarn is treated for 30 minutes at 35° C. at a goods-to-liquor ratio of 1:20 in the following bath:

0.9 gram of 1-(2',3'-hydroxynaphthoylamino)-2,5-dimethoxy-4-chlorobenzene is dissolved in
3 cc. of denatured ethyl alcohol,
0.45 cc. of sodium hydroxide solution at 38° Bé.,
0.9 cc. of formaldehyde solution of 30% strength and
1 cc. of hot water and the solution is made up to 1 liter with water at 35° C.,
3 cc. of the sodium salt of sulfonated castor oil of 50% strength,
6 cc. of sodium hydroxide solution of 38° Bé. and
20 grams of sodium chloride.

The yarn is centrifuged and developed in the following bath:

1.48 grams of 3-amino-6-methylindazol in the form of the diazonium compound are dissolved with
1 gram of a reaction product of ethylene oxide and a fat alcohol and
3.1 grams of hydrochloric acid of 20° Bé. in water at 50° C.,
4 grams of sodium acetate,
2.15 cc. of acetic acid of 50% strength and
20 grams of sodium chloride are then added and the whole is made up to 1 liter with water at 60° C.

After about 15 minutes, an aqueous solution of 2.8 grams of cobaltous chloride is added, the bath is slowly heated to 90° C. and the yarn is treated at this temperature for about 30 minutes. It is then thoroughly rinsed, soaped at the boil with a solution containing, per liter of water, 3 grams of soap and 3 grams of sodium carbonate, rinsed again and dried.

An olive green dyeing of very good fastness to light and to washing is obtained.

When, in the above example, 3.5 grams of nickel sulfate are used instead of 2.8 grams of cobaltous chloride, a violet dyeing of very good fastness to light and to washing is obtained.

When instead of 2.8 grams of cobaltous chloride 3 grams of copper sulfate are used, a greenish grey-blue dyeing is obtained which likewise possesses good fastness properties.

Example 8

Bleached cotton fabric is padded on the foulard with the following solution and then dried:

6.7 grams of 1-(2',3'-hydroxynapththoylamino)-2-methylbenzene are dissolved, in the hot, with
30 cc. of the sodium salt of sulfonated castor oil of 50% strength and
12.8 cc. of sodium hydroxide solution of 38° Bé. and the solution is made up to 1 liter with water.

The fabric is then printed with a paste containing, per kilogram, 70 grams of the sodium salt of phenylhydrazine-para-sulfonic acid,
50 grams of sodium hydroxide solution of 38° Bé.,
380 grams of water and
500 grams of starch tragacanth thickening.

The fabric is then dried and developed at 70° C. in the following bath:

4.35 grams of 3-amino-6-methoxyindazol in the form of the diazonium compound are dissolved in a hot aqueous solution of
2 grams of a reaction product of ethylene oxide and a fat alcohol and
7.2 cc. of hydrochloric acid of 20° Bé. and mixed with
20 cc. of acetic acid of 50% strength and an aqueous solution of
20 grams of sodium acetate and 6.6 grams of cobaltous chloride. The solution is then made up to 1 liter with water at 70° C.

After an air-passage of about 1 minute, the material is treated for about 10 seconds in a bath at 90° C. containing, per liter of water, 10 cc. of acetic acid of 50% strength, rinsed, soaped with a solution containing, per liter of water, 1 gram of a condensation product from an amino-alkyl-sulfonic acid and a high molecular fatty acid, and furthermore 3 grams of sodium carbonate, rinsed again and dried.

A white resist on a green ground is obtained.

*Example 9*

Mixed yarn of wool and staple fiber of regenerated cellulose (50:50) is treated for 45 minutes at 55° C. at a goods-to-liquor ratio of 1:30 in the following bath:

0.5 gram of 1-(2′,3′-hydroxynaphthoylamino)-2-methyl-4-chlorobenzene is dissolved in
1 cc. of denatured ethyl alcohol,
0.2 cc. of sodium hydroxide solution of 38° Bé.,
0.25 cc. of formaldehyde solution of 30% strength and
0.5 cc. of hot water and the solution is made up to 1 liter with water at 55° C.,
3 grams of a condensation product from high molecular fatty acids and protein degradation products,
3 grams of sodium carbonate and
20 grams of sodium chloride.

The material is then rinsed with a solution containing, per liter of water, 30 grams of sodium chloride and 1 gram of sodium carbonate and, after dripping off, developed in the following solution:

0.74 gram of 3-amino-6-methoxyindazol in the form of the diazonium compound is dissolved at 70° C. in an aqueous solution of
1 gram of a reaction product from ethylene oxide and a fat alcohol and
1.7 cc. of hydrochloric acid of 20° Bé.
2 cc. of acetic acid of 50% strength,
10 grams of sodium acetate and
3 grams of cobaltous chloride are then added and the bath is made up to 1 liter with water at 70° C.

When the yarn is introduced, the bath is slowly heated to 90° C. and the material is treated for 30 minutes at this temperature. It is then rinsed, treated for 20 minutes at 60° C. with a solution containing, per liter of water, 1 gram of a reaction product from ethylene oxide and an alkyl phenol and 1 gram of the sodium salt of nitrilotriacetic acid, rinsed again and dried.

A green tone-in-tone dyeing is obtained.

When, instead of 0.74 gram of 3-amino-6-methoxyindazol, 0.7 gram of 3-amino-6-chloro-indazol, likewise in the form of the diazonium compound, is used, an olive green dyeing is obtained.

When natural silk is used instead of the mixed yarn of wool and staple fiber of regenerated cellulose, an olive green dyeing is likewise obtained.

*Example 10*

Cotton yarn is treated for 35 minutes at 35° C. at a goods-to-liquor ratio of 1:20 in the following bath:

1 gram of 2-(2′,3′-hydroxynaphtholyamino)-naphthalene is dissolved in
2 cc. of denatured ethyl alcohol,
0.4 cc. of sodium hydroxide solution of 38° Bé.,
1 cc. of formaldehyde solution of 30% strength and
1 cc. of hot water and the solution is made up to 1 liter with water at 35° C.,
3 grams of the sodium salt of sulfonated castor oil and
10 cc. of sodium hydroxide solution of 38° Bé.

The yarn is centrifuged and developed at a goods-to-liquor ratio of 1:20 with a diazo solution which has been prepared as follows:

0.55 gram of 3-amino-6-methoxyindazol and
0.55 gram of cobaltous chloride are dissolved with
1 cc. of a reaction product of ethylene oxide and a fat alcohol,
1.36 cc. of hydrochloric acid of 20° Bé. and
15 cc. of water.
0.14 cc. of a sodium nitrite solution of 10% strength is then added and diazotization is carried out for 30 minutes.
3 cc. of acetic acid of 50% strength,
10 grams of sodium acetate,
1 gram of potassium bichromate and
20 grams of sodium chloride are then added and the solution is made up to 1 liter with water at 50° C.

When the material is introduced, the bath is heated to 90° C. and the material is treated at this temperature for 30 minutes. It is then rinsed, soaped at the boil with a solution containing, per liter of water, 3 grams of soap and 3 grams of sodium carbonate, rinsed again and dried.

A yellowish green of good fastness properties is obtained.

*Example 11*

Cotton yarn is treated for 30 minutes at 35° C. at a goods-to-liquor ratio of 1:20 in the following bath:

0.98 gram of 1-(2′-hydroxycarbazole-3′-carboylamino)-4-chlorobenzene is dissolved in
3 cc. of denatured ethyl alcohol,
0.5 cc. of sodium hydroxide solution of 38° Bé. and
6 cc. of warm water and the solution is made up to 1 liter with water at 35° C.,
3 grams of a condensation product from high molecular fatty acids and protein degradation products and
10 grams of sodium hydroxide solution of 38° Bé.

The yarn is centrifuged and treated in the following bath:

0.56 gram of 3-amino-6-chloro-indazol is diazotized, while adding
1 gram of a reaction product of ethylene oxide and a fat alcohol, with
1.4 cc. of hydrochloric acid of 20° Bé. and
1.4 cc. of a sodium nitrite solution of 20% strength.
3 cc. of acetic acid of 50% strength,
10 grams of sodium acetate,
20 grams of sodium chloride and
0.85 gram of copper sulfate are then added and the solution is made up to 1 liter with water at about 40° C.

The material is treated for 15 minutes at 40° C., the bath is then heated to 90° C. and the material is treated for 30 minutes at this temperature. It is then thoroughly rinsed, soaped at the boil with a solution containing, per liter of water, 3 grams of soap and 3 grams of sodium carbonate, rinsed again and dried.

A full blue-violet dyeing of very good fastness properties is obtained.

*Example 12*

36 parts by weight of 1-(2′,3′-hydroxynaphthoylamino)-2,4-dimethoxy-5-chlorobenzene are made into a paste with 0.5 part by weight of a reaction product of about 20 mols of ethylene oxide and 1 mol of oleyl alcohol and 36 parts by volume of sodium hydroxide solution of 38° Bé. and the paste is heated for 15 minutes. 1000 parts by volume of hot water are then poured over the paste which is dissolved by boiling. The solution so obtained in run, while stirring well, into a diazo solution which has been prepared by diazotizing in the usual manner 16.3 parts by weight of 3-amino-6-methoxyindazol. The temperature of the reaction solution is kept at 25 to 30° C. by cooling. When the coupling is complete, the red dyestuff which has formed is suction-filtered and washed.

For the conversion of the dyestuff into the complex copper compound, the moist filter cake is suspended in 1000 parts by volume of acetone and mixed with a concentrated aqueous solution of 17.1 parts by weight of crystalline cupric chloride and 25 parts by volume of pyridine. After stirring for a short time, metallization is complete. The reaction mass is diluted with water to about 3000 parts by volume and acidified with 50 parts by volume of hydrochloric acid of 20° Bé. The dyestuff so obtained is suction-filtered, washed and dried. It is a bluish black powder which in admixture with a white pigment yields grey-blue tints when used for a linseed oil paint.

When in the above example 24 parts by weight of crystalline cobaltous chloride are used instead of 17.1 parts of weight of cupric chloride and the metallization is conducted for 5 hours at room temperature, while stirring, the complex cobalt compound is obtained in the form of a greenish black powder which in admixture with a white pigment yields green tints when used for a linseed oil paint.

For the preparation of the complex nickel compound the cupric chloride is replaced in the above example by 24 parts by weight of crystalline nickel chloride and the metallization is carried out by stirring for 5 hours and heating under reflux. A dark powder is obtained which dissolves in organic solvents to give a violet solution. It is suitable for the preparation of lacquers and varnishes and for coloring high molecular plastic masses or for dyeing synthetic fibers.

*Example 13*

Cotton fabric is padded on the foulard with the following solution and dried:

6 grams of 1-(2',3'-hydroxynaphthoylamino)-2,4-dimethoxy-5-chlorobenzene are dissolved in
10 cc. of denatured ethyl alcohol,
20 grams of Monopol Brilliant Oil and
10 cc. of sodium hydroxide solution of 38° Bé. and the solution so obtained is made up to 1 liter with hot water at 90° C.

The dyestuff is then developed on a three-roller foulard by dipping the material twice into the following disazo-solution:

2.8 grams of 3-amino-4-chloro-indazol, dissolved in
13.7 cc. of hydrochloric acid of 20° Bé and
60 cc. of water, are introduced into a solution of
1.34 grams of sodium nitrite in
20 grams of ice water. When the diazotization is complete, the whole is made up to 1 liter with water after the addition of
20 grams of sodium acetate.

After passing air through the material for about 30 seconds, the material is treated with water at 80° C., rinsed, soaped at 60° C., rinsed again and dried. The dried material is printed with the following printing paste:

200 grams of sodium-formaldehyde-sulfoxylate,
50 grams of the sodium salt of benzylsulfanilic acid 1:1,
100 grams of potassium carbonate,
30 grams of anthraquinone paste of 30% strength,
350 grams of starch-tragacanth thickening,
270 grams of water
-----
1000 grams.

The material is then dried, steamed for 7 minutes, rinsed at 80° C. in a bath containing, per liter of water, 10 grams of sodium carbonate, and after-treated for 20 minutes at 95–100° C. in a bath containing, per liter of water, 1 gram of a reaction product from about 10 mols of ethylene oxide and 1 mol of isododecyl phenol, 1 gram of sodium carbonate, 1 gram of copper sulfate and 4 grams of triethanolamine, rinsed again and dried.

A blue-grey dyeing with white discharge effects is obtained. When in the above example a bath is used for the metallization which contains, per liter of water, 1 gram of a reaction product from about 10 mols of ethylene oxide and 1 mol of isododecyl phenol, 3 grams of sodium carbonate, 1.2 grams of cobaltous chloride and 2.5 grams of aminoacetic acid, a green dyeing with white discharge effects is obtained.

By the additional use of vat dyestuffs in the discharge printing paste, colored effects on blue-grey or green ground can furthermore be prepared.

*Example 14*

Chrome-tanned and pre-soaked white lambskins are treated in the proportion of dry weight to dyebath of 1:20 for 90 minutes at 38–40° C. in the following bath:

0.5 gram of 1 - (2',3' - hydroxynaphthoylamino)-2,4-dimethoxy-5-chlorobenzene is dissolved in
1.5 cc. of denatured ethyl alcohol,
0.17 cc. of sodium hydroxide solution of 32% strength,
0.5 cc. of formaldehyde solution of 30Z strength and
0.5 cc. of water, and the solution so obtained is introduced into a bath containing, per liter of water,
3 grams of a condensation product from fatty acids of high molecular weight and protein degradation products,
5 cc. of a formaldehyde solution of 30% strength,
10 cc. of sodium hydroxide solution of 32% strength and
100 grams of sodium chloride.

The skins are then treated for 10 minutes in a solution containing, per liter of water, 50 grams of sodium chloride,
2 grams of sodium bicarbonate and
2 grams of sodium carbonate.

The liquid is then allowed to drop off and the skins are treated in a developing bath at about 40° C. containing, per liter of water, 0.63 gram of 3-amino-6-chloro-indazol in the form of a diazonium compound prepared in the usual manner, 0.2 gram of a reaction product from about 20 mols of ethylene oxide and 1 mol of octodecyl alcohol, 20 grams of sodium chloride, 4 cc. of acetic acid of 50% strength and 10 grams of sodium acetate.

After about 1 hour, 4 grams of copper sulfate dissolved in water are added to this bath. It is then heated to 65° C. and the material is treated for 2 to 3 hours at this temperature. The skins are then laid for 1 hour into a bath at 30° C. containing, per liter of water, 3 cc. of formic acid of 85% strength and 1 gram of sulfuric acid of 96% strength, and rinsed cold. The flesh side of the skins is then brushed with a sodium chloride solution, fat-liquored, dried and cleared.

A grey dyeing of very good fastness to light is obtained.

*Example 15*

1 kilogram of cotton yarn is treated for 45 minutes at 35° C. in the following bath:

25 grams of 1 - (2',3' - hydroxynaphthoylamino)-2,4-dimethoxy-5-chlorobenzene are dissolved in
75 cc. of denatured ethyl alcohol,
8.4 cc. of sodium hydroxide solution of 38° Bé.,
8.4 cc. of a formaldehyde solution of 30% strength and
25 cc. of hot water, and the solution so obtained is made up to 20 liters with water at 35° C.,
120 cc. of sodium hydroxide solution of 38° Bé.,
100 grams of Monopol Brilliant Oil and
400 grams of sodium chloride.

The material is then centrifuged and developed in the following bath:

14 grams of 3-amino-6-trifluoromethyl-indazol and
25 grams of colbaltous chloride are dissolved in
240 cc. of water and
54.5 cc. of hydrochloric acid of 20° Bé., and the solution so obtained is diazotized by stirring it into a solution of 5.32 grams of sodium nitrite in
200 cc. of ice water.

The diazo solution so obtained is introduced into a bath containing, per 20 liters of water at 35° C. to 40° C., 20 cc. of acetic acid of 50% strength,
10 grams of potassium bichromate,
200 grams of sodium acetate and
400 grams of sodium chloride.

When the material has been introduced at 35° C., the bath is slowly heated to 90° to 95° C., and the material is treated for 30 minutes at this temperature. It is then rinsed hot and cold, soaped at the boil with a washing agent in a solution containing, per liter of water, 1 gram of the sodium salt of ethylenediamine-tetra-acetic acid and 1 gram of sodium carbonate, rinsed again hot and cold, and dried.

A bluish green dyeing of very good properties of fastness is obtained.

When in the above example 11.85 grams of 3-amino-5-nitro-indazol are used, instead of 14 grams of 3-amino-6-trifluoromethyl-indazol a yellowish green dyeing is obtained.

*Example 16*

1 kilogram of cotton yarn is treated for 45 minutes at 35° C. in the following bath:

20 grams of 2-(2',3'-hydroxynaphthoylamino)-naphthalene are dissolved in
40 cc. of denatured ethyl alcohol,
8 cc. of sodium hydroxide solution of 38° Bé.,
20 cc. of a formaldehyde solution of 30% strength and
20 cc. of hot water and the solution so obtained is made up to 20 liters with water at 35° C.,
200 cc. of sodium hydroxide solution of 38° Bé. and
100 grams of Monopol Brilliant Oil.

The material is then centrifuged and developed for 30 minutes at 40° C. in the following bath:

17.6 grams of 3-amino-indazol-5-sulfonic acid-diethylamide are diazotized with
54.5 cc. of hydrochloric acid of 20° Bé. and
5.32 grams of sodium nitrite.

The diazo solution so obtained is made up to 20 liters with water 20 cc. acetic acid of 50% strength,
200 grams of sodium acetate and
400 grams of sodium chloride.

The material is then rinsed and after-treated for 30 minutes at 90° C. to 95° C. in a solution containing, per 20 liters of water, 30 grams of copper sulfate,
90 grams of triethanolamine,
20 grams of a reaction product of about 20 mols of ethylene oxide and 1 mol of isododecylphenol, and
60 grams of calcined sodium carbonate.

A blue-grey dyeing of very good properties of fastness is obtained.

When in the above example 36 grams of cobaltous chloride and 72 grams of aminoacetic acid are used for the metallization instead of 30 grams of copper sulfate and 90 grams of triethanolamine, and the material is treated as indicated above, a green dyeing of very good fastness to light and washing is obtained.

The following table indicates a number of further compounds which can be used in this invention, and also the tints of the azo-dyestuffs produced from these components on the fiber, which likewise possess good properties of fastness.

| Diazo component | Coupling component | Tint | | |
|---|---|---|---|---|
| | | Cobalt complex | Nickel complex | Copper complex |
| 3-amino-indazol | 1-(2',3'-hydroxynaphthoylamino)-2-methylbenzene. | Bluish green | | Blue-grey. |
| Do | 1-(2',3'-hydroxynaphthoylamino)-2-methyl-4-chlorobenzene. | do | Violet | Do. |
| Do | 1-(2',3'-hydroxy-naphthoylamino)-2-methoxy-4-chloro-5-methylbenzene. | do | | Blue-green. |
| Do | 2-(2',3'-hydroxynaphthoylamino)-naphthalene | Green-grey | Bluish claret | Do. |
| Do | 1-(6'-bromo-2',3'-hydroxy-naphthoylamino)-2-methoxy-benzene. | Green | Reddish dark blue | Do. |
| Do | 1-(2'-hydroxy-carbazole-3'-carboylamino)-4-chlorobenzene. | | Violet-brown | Violet. |
| 3-amino-5-chloro-indazol | 1-(2',3'-hydroxy-naphthoylamino)-2,4-dimethoxy-5-chlorobenzene. | | Currant | Greenish dark grey. |
| Do | 1-(2',3'-hydroxy-naphthoylamino)-naphthalene. | | do | Dark grey. |
| Do | 2-(2',3'-hydroxy-naphthoylamino)-naphthalene. | | Dark red-brown | Greenish dark grey. |
| Do | 2-(2',3'-hydroxy-naphthoylamino)-3-methoxy-diphenylene oxide. | | do | Do. |
| 3-amino-6-chloro-indazol | 1-(2',3'-hydroxy-naphthoylamino)-2-methoxybenzene. | Olive green | Dull red-violet | Blue-grey. |
| Do | 1-(2',3'-hydroxy-naphthoylamino)-2-methyl-4-chlorobenzene. | Brownish green | Claret | Reddish grey. |
| Do | 2-(2',3'-hydroxy-naphthoylamino)-naphthalene. | Olive green | Currant | Blue-grey. |
| 3-amino-6-chlorindazol | 1-(2',3'-hydroxy-naphthoylamino)-2,4-dimethoxy-5-chlorobenzene. | Bluish green | do | Do. |
| Do | 1-(6'-bromo-2',3'-hydroxy-naphthoylamino)-2-methoxybenzene. | do | Bluish violet | Blue green. |
| Do | 1-(2',3'-hydroxy-naphthoylamino)-2-methylbenzene. | Green | | Blue-grey. |
| Do | 1-(2',3'-hydroxy-naphthoylamino)-2-methyl-4-methoxybenzene. | do | | Do. |
| Do | 1-(2',3'-hydroxy-naphthoylamino)-2,5-dimethoxybenzene. | do | | Do. |
| Do | 1-(2',3'-hydroxy-naphthoylamino)-2-methoxy-5-chlorobenzene. | do | | Do. |
| Do | 1-(2',3'-hydroxy-naphthoylamino)-2,5-dimethoxy-4-chlorobenzene. | do | | Do. |
| Do | 1-(2',3'-hydroxy-naphthoylamino)-naphthalene. | do | | Do. |
| Do | 1-(2'-hydroxy-anthracene-3'-carboylamino)-2-methylbenzene. | do | | Green. |
| 3-amino-6-methyl indazol | 2,3-hydroxynaphthoylaminobenzene | Olive green | Currant | Greenish grey-blue. |
| Do | 1-(2',3'-hydroxynaphthoylamino)-2-methylbenzene. | do | Violet | Do. |
| Do | 1-(2',3'-hydroxynaphthoylamino)-2-methoxybenzene. | do | Bluish claret | Do. |
| Do | 1-(2',3'-hydroxynaphthoylamino)-2,4-dimethoxy-5-chlorobenzene. | do | Violet | Do. |

|  |  | Tint | | |
|---|---|---|---|---|
| Diazo component | Coupling component | Cobalt complex | Nickel complex | Copper complex |
| 3-amino-6-methylindazol | 1-(2',3'-hydroxynaphthoylamino)-2-methyl-4-chlorobenzene. | Olive green | Bluish claret | Greenish grey-blue. |
| Do | 1-(2',3'-hydroxynaphthoylamino)-2-methoxy-4-chloro-5-methylbenzene. | do | Violet | Do. |
| Do | 2-(2',3'-hydroxynaphthoylamino)-naphthalene. | do | do | Do. |
| Do | 1-(2'-hydroxy-carbazole-3'-carboylamino)-4-chlorobenzene. | Dark grey | Dark violet | Reddish dark blue. |
| 3-amino-6-methoxyindazol | 1-(6'-bromo-2',3'-hydroxynaphthoylamino)-2-methoxybenzene. | Bright green | Reddish dark blue | |
| Do | 4,4'-bis-(2'',3''-hydroxynaphthoylamino)-3,3'-dimethoxy-diphenyl. | Green | Currant | |
| Do | 1-(2'-hydroxyanthracene-3'-carboylamino)-2-methylbenzene. | Yellowish green | Green | |
| Do | 1-(5'-hydroxy-1',1'',2',2''-benzocarbazole-4'-carboylamino)-4-methoxybenzene. | Dark brown | Dark grey | |
| Do | Terephthaloyl-bis-(1-acetylamino-2-methoxy-4-chloro-5-methylbenzene). | Yellow of an olive hue | Old gold | |
| Do | 1-(2'-hydroxy-carbazole-3'-carboylamino)-4-chlorobenzene. | Dark grey | Currant | |
| Do | 1-(2',3'-hydroxynaphthoylamino)-2,4-dimethylbenzene. | Bright green | Violet | |
| Do | 1-(2',3'-hydroxynaphthoylamino)-2-methylbenzene. | Green | do | |
| Do | 1-(2',3'-hydroxynaphthoylamino)-2-methyl-4-chlorobenzene. | Yellowish green | do | |
| Do | 1-(2',3'-hydroxynaphthoylamino)-2-methyl-5-chlorobenzene. | Green | do | |
| Do | 1-(2',3'-hydroxynaphthoylamino)-2-methoxy-4-chloro-5-methylbenzene. | Yellowish green | do | |
| Do | 1-(2',3'-hydroxynaphthoylamino)-2,5-dimethoxybenzene. | do | do | |
| Do | 1-(2',3'-hydroxynaphthoylamino)-2-methoxy-5-chlorobenzene. | do | do | |
| Do | 1-(2',3'-hydroxynaphthoylamino)-naphthalene. | do | do | |
| Do | 1-(2',3'-hydroxynaphthoylamino)-4-ethoxybenzene. | do | Red-brown | |
| Do | 1-(2',3'-hydroxynaphthoylamino)-4-methylbenzene. | do | do | |
| Do | 1-(2',3'-hydroxynaphthoylamino)-2,3-dimethylbenzene. | do | do | |
| Do | 1-hydroxy-4-methylbenzene-2-carboxylic acid-phenylamide. | Olive green | Violet grey | Greenish grey. |
| Do | 1-hydroxy-4,5-dichlorobenzene-2-carboxylic acid-phenylamide. | Green-grey | Red-brown | Grey-green. |
| Do | 1-(2',3'-hydroxynaphthoylamino)-2,5-dimethoxy-4-chlorobenzene. | Yellowish green | Violet | |
| Do | 1-(4'-hydroxy-diphenyl-3'-carboylamino)-2-methoxybenzene. | Olive green | Green-grey | Green-grey. |
| 3-amino-6-ethoxyindazol (melting at 222° to 224°C). | 1-(2',3'-hydroxynaphthoylamino)-2-methoxy-5-chlorobenzene. | Yellowish green | Reddish violet | Blue-grey. |
| Do | 1-(2',3'-hydroxynaphthoylamino)-2-methylbenzene. | Green | Violet | |
| Do | 1-(2',3'-hydroxynaphthoylamino)-2-methoxybenzene. | do | do | |
| Do | 1-(2',3'-hydroxynaphthoylamino)-2-methyl-4-chlorobenzene. | do | do | |
| Do | 1-(2',3'-hydroxynaphthoylamino)-2-methyl-4-methoxybenzene. | do | do | |
| Do | 1-(2',3'-hydroxynaphthoylamino)-2,5-dimethoxybenzene. | do | do | |
| Do | 1-(2',3'-hydroxynaphthoylamino)-2,5-dimethoxy-4-chlorobenzene. | do | do | Do. |
| 3-amino-6-ethoxyindazol | 1-(2',3'-hydroxynaphthoylamino)-2,4-dimethoxy-5-chloro benzene. | Yellowish green | do | |
| Do | 1-(2',3'-hydroxynaphthoylamino)-2-methoxy-4-chloro-5-methylbenzene. | Green | do | |
| Do | 1-(2',3'-hydroxynaphthoylamino)-naphthalene. | do | do | |
| Do | 1-(6'-bromo-2',3'-hydroxynaphthoylamino)-2-methoxybenzene. | Yellowish green | Violet blue | Blue-green. |
| Do | 2-(2',3'-hydroxynaphthoylamino)-naphthalene. | Green | Violet-grey | Blue-grey. |
| Do | 1-(2'-hydroxycarbazole-3'-carboylamino)-4-chlorobenzene. | Greenish grey | Currant | |
| Do | 1-hydroxy-4-methylbenzene-2-carboxylic acid-phenylamide. | Olive green | Violet-grey | Grey. |
| Do | 1-hydroxy-4,5-dichlorobenzene-2-carboxylic acid-phenylamide. | Grey | do | Do. |
| Do | 1-(4'-hydroxy-diphenyl-3'-carboylamino)-2-methoxybenzene. | Olive green | Blue-green | Greenish grey. |

|  |  | Iron complex | Zinc complex | Uranium complex | Cadmium complex |
|---|---|---|---|---|---|
| 3-amino-6-methoxy-indazol. | 1-(2',3'-hydroxynaphthoylamino)-2-methoxy-4-chloro-5-methylbenzene. | Currant | Violet | Red-violet | Violet. |

|  |  | Cobalt complex | Copper complex |
|---|---|---|---|
| 3-amino-4-chloroindazol | 2,3-hydroxynaphthylaminobenzene | Green | |
| Do | 1-(2',3'-hydroxynaphthoylamino)-2-methyl benzene. | do | |
| Do | 1-(2',3'-hydroxynaphthoylamino)-2-methoxybenzene. | do | |
| Do | 1-(2',3'-hydroxy-naphthoylamino)-2-ethoxybenzene. | do | |
| Do | 1-(2',3'-hydroxy-naphthoylamino)-4-methoxybenzene. | do | |

| Diazo component | Coupling component | Cobalt complex | Copper complex |
|---|---|---|---|
| 3-amino-4-chloroindazol | 1 - (2', 3' - hydroxy - naphthoylamino) - 2 - methyl-4-methoxybenzene. | Green | |
| Do | 1 - (2', 3' - hydroxy - naphthoylamino) - 2, 5 - dimethoxybenzene. | do | |
| Do | 1 - (2', 3' - hydroxy - naphthoylamino) - 4 - ethoxybenzene. | do | |
| Do | 1 - (2', 3' - hydroxy - naphthoylamino) - 3 - nitrobenzene. | Blue-green | |
| Do | 1 - (2', 3' - hydroxy - naphthoylamino) - 2 - methyl-4-chlorobenzene. | Green | Blue-grey. |
| Do | 1 - (2', 3' - hydroxy - naphthoylamino) - 2 - methoxy-5-chlorobenzene. | do | Do. |
| Do | 1 - (2', 3' - hydroxy - naphthoylamino) - naphthalene. | do | Do. |
| Do | 1 - (6' - bromo - 2', 3' - hydroxynaphthoyl - amino)-2-methoxybenzene. | do | |
| Do | 1 - (2', 3' - hydroxy - naphthoylamino) - 4 - chlorobenzene. | do | |
| Do | 1 - (2', 3' - hydroxy - naphthoylamino) - 2, 5 - dimethoxy-4-chlorobenzene. | do | |
| Do | 1 - (2', 3' - hydroxy - naphthoylamino) - naphthalene. | do | Greenish blue-grey. |
| Do | 1 - (2', 3' - hydroxy - naphthoylamino) - 2 - methoxy-4-chloro-5-methylbenzene. | do | Blue-grey. |
| Do | 2 - (2', 3' - hydroxy - naphthoylamino) - 3 - methoxydiphenylene-oxide. | do | |
| Do | 1 - (2', 3' - hydroxy - naphthoylamino) - 2, 4 - dimenthylbenzene. | do | |
| Do | 1 - (2', 3' - hydroxy - naphthoylamino) - 2 - methyl-5-chlorobenzene. | Blue-green | |
| Do | 1 - (2', 3' - hydroxy - naphthoylamino) - 4 - methylbenzene. | Green | |
| Do | 1 - (2', 3' - hydroxy - naphthoylamino) - 2, 3 - dimethylbenzene. | do | |
| Do | 4, 4 - bis - (2'', 3'' - hydroxynaphthoyl - amino-3,3'-dimethoxydiphenyl. | Olive | |
| Do | 1 - (2' - hydroxycarbazole - 3 - carboylamino) - 4-chlorobenzene. | Blue-grey | |
| Do | 1 - (2' - hydroxy - anthracene - 3 - carboyl - amino) - 2 - methylbenzene. | Yellowish green | |
| Do | 1 - (5 - hydroxy - 1', 2', 1'', 2'' - benzocarbazole - 4'-carboylamina)-4-methoxybenzene. | Violet-brown | |
| Do | 1 - (5' - hydroxy - 1',2', 1'', 2'' - benzocarbazole - 4' - carboylamino) - 2 - methyl - 4 -methoxy - benzene. | Currant | |
| 3-amino-5-methoxyindazol | 2,3-hydroxynaphthoyl-aminobenzene | Olive-green | Do. |
| Do | 1-(2',3'-hydroxy-naphthoylamino)-2-methyl-benzene. | do | Reddish blue-grey. |
| Do | 1-(2',3'-hydroxy-naphthoylamino)-2-methoxybenzene. | do | Greenish blue-grey. |
| Do | 1-(2',3'-hydroxy-naphthoylamino)-2-ethoxybenzene. | do | Blue-grey. |
| Do | 1-(2',3'-hydroxy-naphthoylamino)-4-methoxybenzene. | do | Do. |
| Do | 1-(2',3'-hydroxy-naphthoylamino)-2-methyl-4-methoxybenzene. | do | Reddish blue-grey. |
| Do | 1-(2',3'-hydroxy-naphthoylamino)-2,5-dimethoxy-benzene. | do | Blue-grey. |
| Do | 1-(2',3'-hydroxy-naphthoylamino)-4-ethoxybenzene. | do | Do. |
| Do | 1-(2',3'-hydroxy-naphthoylamino)-3-nitrobenzene. | Bluish olive green | Do. |
| Do | 1-(2',3'-hydroxy-naphthoylamino)-2-methyl-4-chlorobenzene. | Olive green | Violet-grey. |
| Do | 1-(2',3'-hydroxy-naphthoylamino)-2-methoxy-5-chlorobenzene. | do | Greenish blue-grey. |
| Do | 1-(2',3'-hydroxy-naphthoylamino)-2,4-dimethoxy-5-chlorobenzene. | do | Blue-grey. |
| Do | 1-(2',3'-hydroxy-naphthoylamino)-naphthalene. | do | Do. |
| Do | 1-(6'-bromo-2',3'-hydroxynaphthoyl-amino-2-methoxy-benzene. | do | Greenish blue-grey. |
| Do | 1-(2',3'-hydroxy-naphthoylamino)-4-chlorobenzene. | do | Blue-grey. |
| Do | 1-(2',3'-hydroxy-naphthoylamino)-2,5-dimethoxy-4-chlorobenzene. | do | Do. |
| Do | 2-(2',3'-hydroxy-naphthoylamino)-naphthalene. | do | Greenish blue-grey. |
| Do | 1-(2',3'-hydroxy-naphthoylamino)-2-methoxy-4-chloro-5-methylbenzene. | do | Do. |
| Do | 1-(2',3'-hydroxy-naphthoylamino)-2-methyl-5-chlorobenzene. | Bluish olive green | Blue-grey. |
| Do | 2-(2',3'-hydroxy-naphthoylamino)-3-methoxydiphenylene oxide. | Yellowish olive green | Greenish blue-grey. |
| Do | 1-(2'-hydroxy-carbazole-3'-carboylamino)-4-chlorobenzene. | Grey | Reddish dark blue. |
| Do | 1-(2'-hydroxyanthracene - 3' - carboylamino) - 2-methylbenzene. | Yellowish green | Green. |
| Do | 1-5'-hydroxy-1',2',1'',2''-benzocarbazole-4'-carboylamino) - 4 - methoxybenzene. | Brown | Violet-grey. |
| Do | 1-(5'-hydroxy-1',2',1'',2''-benzocarbazole-4'-carboylamino)-2-methyl-4-methoxybenzene. | do | Do. |
| Do | 1 - (2',3'- hydroxy - naphthoylamino) - 2,4-dimethylbenzene. | Bluish olive green | Blue-grey. |
| 3 - amino - 5 - methoxy - 6-chlorindazol. | 2 - (2',3' - hydroxy - naphthoylamino) - naphthalene. | Blue-green | Do. |
| Do | 1 - (2',3' - hydroxy - naphthoylamino) - 2,4-dimethoxy-5-chlorobenzene. | Green | Do. |
| Do | 1 - (2',3' - hydroxy - naphthoylamino) - 2 - methoxy-5-chlorobenzene. | Olive-green | Do. |
| Do | 1 - (2',3' - hydroxy - naphthoylamino) - naphthalene. | Green | Do. |
| Do | 1 - (2',3' - hydroxy - naphthoylamino) - 2 - methoxy - 4 - chloro - 5 - methylbenzene. | Blue-green | Do. |
| Do | 1 - (6' - bromo - 2',3' - hydroxynaphthoyl - amino)-2-methoxybenzene. | Green | Do. |
| Do | 1-(2'-hydroxy-carbazole-3'-carboylamino)-4-chlorobenzene. | Grey | Dark blue. |
| 3-amino-6-methyl-indazol | 1 - (2',3' - hydroxy - naphthoylamino) - 2 - ethoxybenzene. | Green | Reddish blue-grey. |

| Diazo component | Coupling component | Cobalt complex | Copper complex |
|---|---|---|---|
| 3-amino-6-methyl-indazol | 1 - (2',3' - hydroxy - naphthoylamino) - 4 - methoxybenzene. | Green | Blue-grey. |
| Do | 1 - (2',3' - hydroxy - naphthoylamino) - 2 - methyl-4-methoxybenzene. | do | Do. |
| Do | 1 - (2',3' - hydroxy - naphthoylamino) - 2,5 - dimethoxybenzene. | do | Do. |
| Do | 1 - (2',3' - hydroxy-naphthoylamino)-4-ethoxybenzene. | do | Reddish blue-grey. |
| Do | 1 - (2',3' - hydroxynaphthoylamino) - 3 - nitrobenzene. | do | Blue-grey. |
| Do | 1 - (2',3' - hydroxynaphthoylamino)-naphthalene. | do | Do. |
| Do | 1-(6'-bromo-2',3'-hydroxynaphthoylamino)-2-methoxybenzene. | do | Greenish blue-grey. |
| Do | 1 - (2',3' - hydroxynaphthoylamino) - 4 - chlorobenzene. | do | Blue-grey. |
| Do | 1 - (2',3' - hydroxynaphthoylamino) -2-methyl-5-chlorobenzene. | do | Do. |
| Do | 2 - (2',3' - hydroxynaphthoylamino) - 3 - methoxy-diphenylene oxide. | Olive-green | Do. |
| Do | 1 - (2' - hydroxyanthracene - 3' - carboylamino)-2-methylbenzene. | Yellowish green | Green. |
| Do | 1 - (5' - hydroxy - 1',2',1'',2''-benzocarbazole - 4'-carboylamino)-4-methoxybenzene. | Brown | Reddish blue-grey. |
| Do | 1 - (5' - hydroxy - 1',2',1'',2'' - benzocarbazole - 4' - carboylamino) - 2 - methyl - 4 - methoxybenzene. | do | Do. |
| Do | 1 - (2',3' - hydroxynaphthoylamino) - 2,4 - dimethylbenzene. | Green | Covered blue. |
| Do | 1 - (6' - methoxy - 2',3' - hydroxynaphthoylamino)-2-methyl-5-chlorobenzene. | Yellowish green | Blue-green. |
| Do | 1 - (6' - methoxy - 2',3' - hydroxy-naphthoylamino)-2-methoxybenzene. | do | Do. |

| Diazo component | Coupling component | Copper complex | Cobalt complex | Nickel complex |
|---|---|---|---|---|
| 3-amino-indazol-5-sulfonic acid-diethylamide. | 2,3-hydroxynaph-thoylaminobenzene | Blue-grey | Green | Claret. |
| Do | 1 - (2',3' - hydroxy - naphthoylamino) - 2 - methylbenzene. | do | do | Red-violet. |
| Do | 1 - (2',3' - hydroxy - naphthoylamino) - 2 - methoxybenzene. | Greenish blue-grey | do | Do. |
| Do | 1 - (2',3' - hydroxy - naphthoylamino) - 2 - ethoxybenzene. | Blue-grey | do | Claret. |
| Do | 1 - (2',3' - hydroxy - naphthoylamino) - 4 - methoxybenzene. | do | do | Do. |
| Do | 1 - (2',3' - hydroxy - naphthoylamino) - 2 - methyl-4-methoxybenzene. | do | do | Red-violet. |
| Do | 1 - (2',3' - hydroxy - naphthoylamino) - 2,5 - dimethoxy-benzene. | do | do | Violet. |
| Do | 1 - (2',3' - hydroxy - naphthoylamino) - 4 - ethoxybenzene. | do | do | Claret. |
| Do | 1 - (2',3' - hydroxy - naphthoylamino) - 3 - nitrobenzene. | Greenish blue-grey | do | Red-violet. |
| Do | 1 - (2',3' - hydroxy - naphthoylamino) - 2 - methyl-4-chloro-benzene. | Blue-grey | do | Violet. |
| Do | 1 - (2',3' - hydroxy - naphthoylamino) - 2 - methoxy-5-chloro-benzene. | do | do | Do. |
| Do | 1 - (2',3' - hydroxy - naphthoylamino) - 2,4 - dimethoxy-5-chlorobenzene. | do | do | Do. |
| Do | 1 - (2',3' - hydroxy - naphthoylamino) - naphthalene. | do | do | Do. |
| Do | 1 - (2',3' - hydroxy - naphthoylamino) - 4 - chlorobenzene. | Greenish blue-grey | do | Claret. |
| Do | 1 - (2',3' - hydroxy - naphthoylamino) - 2,5 - dimethoxy-4-chlorobenzene. | do | do | Reddish viole. |
| Do | 1 - (2',3' - hydroxy - naphthoylamino) - 2 - methoxy-4-chloro-5-methylbenzene. | do | do | Do. |
| Do | 1 - (2',3' - hydroxy - naphthoylamino) - 2,4 - dimethylbenzene. | Blue-grey | do | Violet. |
| Do | 1 - (2',3' - hydroxy - naphthoylamino) - 4 - methylbenzene. | do | do | Claret. |
| Do | 1 - (2',3' - hydroxy - naphthoylamino) - 2,3 - dimethylbenzene. | do | do | Violet. |
| Do | 2 - (2',3' - hydroxy - naphthoylamino) - naphthalene. | Greenish blue-grey | do | Bluish claret. |
| Do | 2 - (2',3' - hydroxy - naphthoylamino) - 3 - methoxy-diphenylene oxide. | Blue-grey | do | Currant. |
| Do | 4,4' - bis - (2'',3'' - hydroxynaphthoyl - amino) - 3,3'-dimethoxy-diphenyl. | Grey | Olive | Bluish claret. |
| Do | 1 - (6' - bromo - 2',3' - hydroxynaphthoyl - amino)-2-methoxy-benzene. | Greenish blue-grey | Green | Violet. |
| Do | 1 - (2 - hydroxyanthracene - 3' - carboyl-amino)-2-methylbenzene. | Green | Yellowish green | Dark green. |
| Do | 1 - (5' - hydroxy - 1',2,1'',2'' - benzocarbazole - 4'-carboylamino)-4-methoxybenzene. | Grey of violet hue | Brown | Grey. |
| 3-amino-5-trifluoromethyl-indazol. | 1-(2',3'-hydroxynaphthoylamino)-2,5-dimethoxybenzene. | Greenish blue-grey | Green | |
| Do | 1-(2',3'-hydroxynaphthoylamino)-2-methyl-4-chlorobenzene. | Reddish blue-grey | do | |
| Do | 1-(2',3'-hydroxynaphthoylamino)-2-methoxy-5-chlorobenzene. | Greenish blue-grey | do | |
| Do | 1-(2',3'-hydroxynaphthoylamino) - 2,4 - dimethoxy-5-chlorobenzene. | Blue-grey | do | |
| Do | 1-(2',3'-hydroxynaphthoylamino)-naphthalene | do | do | |
| Do | 1-(2',3'-hydroxynaphthoylamino)-2-methoxy-4-chloro-5-methylbenzene. | do | do | |
| Do | 1-(6'-bromo-2',3'-hydroxynaphthoylamino)-2-methoxybenzene. | Greenish blue-grey | do | |
| Do | 2,3-hydroxynaphthoylamino)-naphthalene | Blue-grey | Bluish green | Currant. |
| 3-amino-6-trifluoromethyl-indazol. | 2,3-hydroxynaphthoylaminobenzene | do | do | Bluish claret. |
| Do | 1-(2',3'-hydroxynaphthoylamino)-2-methoxybenzene. | do | Bluish green | Violet. |
| Do | 1-(2',3'-hydroxynaphthoylamino) - 2 - methylbenzene. | do | | |
| Do | 1-(2',3'-hydroxynaphthoylamino) - 2 - ethoxybenzene. | do | | |

| Diazo component | Coupling component | Copper complex | Cobalt complex | Nickel complex |
|---|---|---|---|---|
| 3-amino-6-trifluoromethyl-indazol. | 1-(2',3'-hydroxynaphthoylamino)-4-methoxybenzene. | Blue-grey | Bluish green | Violet-grey. |
| Do | 1-(2',3'-hydroxynaphthoylamino)-2-methyl-4-methoxybenzene. | do | do | Reddish violet. |
| Do | 1-(2',3'-hydroxynaphthoylamino)-2,5-dimethoxybenzene. | do | do | Violet. |
| Do | 1-(2',3'-hydroxynaphthoylamino)-4-ethoxybenzene. | do | do | Currant. |
| Do | 1-(2',3'-hydroxynaphthoylamino)-3-nitrobenzene. | do | do | Violet. |
| Do | 1-(2',3'-hydroxynaphthoylamino)-2-methyl-4-chlorobenzene. | do | Blue-green | Do. |
| Do | 1-(2',3'-hydroxynaphthoylamino)-2-methoxy-5-chlorobenzene. | do | do | Reddish violet. |
| Do | 1-(2',3'-hydroxynaphthoylamino)-2,4-dimethoxy-5-chlorobenzene. | do | do | Do. |
| Do | 1-(2',3'-hydroxynaphthoylamino)-naphthalene. | do | do | Do. |
| Do | 1-(2',3'-hydroxynaphthoylamino)-4-chlorobenzene. | do | do | Do. |
| Do | 1-(2',3'-hydroxynaphthoylamino)-2,5-dimethoxy-4-chlorobenzene. | do | do | Reddish violet. |
| Do | 1-(2',3'-hydroxynaphthoylamino)-2-methoxy-4-chloro-5-methylbenzene. | do | do | Do. |
| Do | 1-(2',3'-hydroxynaphthoylamino)-2-methyl-5-chlorobenzene. | do | do | Do. |
| Do | 2-(2',3'-hydroxynaphthoylamino)-naphthalene. | do | do | Currant. |
| Do | 2-(2',3'-hydroxynaphthoylamino)-3-methoxy-diphenylene oxide. | do | do | Do. |
| Do | 1-(6'-bromo-2',3'-hydroxynaphthoylamino)-2-methoxybenzene. | do | do | Violet. |
| Do | 1-(2'-hydroxycarbazole-3'-carboylamino)-4-chlorobenzene. | Reddish dark blue | Olive | Brown. |
| Do | 1-(2'-hydroxyanthracene-3'-carboylamino)-2-methylbenzene. | Green | do | Grey. |
| Do | 1-(5'-hydroxy-1',2',1'',2''-benzocarbazole-4'-carboylamino)-4-methoxybenzene. | Reddish grey | Violet-grey | Violet-grey |
| Do | 1-(5'-hydroxy-1',2',1'',2''-benzocarbazole-4'-carboylamino)-2-methyl-4-methoxy-benzene. | do | do | Do. |
| 3-amino-6-nitro-indazol | 2,3-hydroxynaphthoylaminobenzene | Blue-grey | Yellowish green | Currant. |
| Do | 1-(2',3'-hydroxynaphthoylamino)-2-methylbenzene. | do | do |  |
| Do | 1-(2',3'-hydroxynaphthoylamino)-2-methoxybenzene. | Greenish blue-grey | Olive green | Do. |
| Do | 1-(2',3'-hydroxynaphthoylamino)-2-ethoxybenzene. | Blue-grey | do | Do. |
| Do | 1-(2',3'-hydroxynaphthoylamino)-4-methoxybenzene. | do | Yellowish green | Do. |
| Do | 1-(2',3'-hydroxynaphthoylamino)-2-methyl-4-methoxybenzene. | do | do | Violet-grey. |
| Do | 1-(2',3'-hydroxynaphthoylamino)-2,5-dimethoxybenzene. | Greenish blue-grey | do | Reddish blue-grey. |
| Do | 1-(2',3'-hydroxynaphthoylamino)-4-ethoxybenzene. | Blue-grey | do | Currant. |
| Do | 1-(2',3'-hydroxynaphthoylamino)-3-nitrobenzene. | Greenish blue-grey | Green | Grey. |
| Do | 1-(2',3'-hydroxynaphthoylamino)-2-methyl-4-chlorobenzene. | Blue-grey | Yellowish green | Blue-grey. |
| Do | 1-(2',3'-hydroxynaphthoylamino)-2-methoxy-5-chlorobenzene. | Greenish blue-grey | do | Reddish blue-grey. |
| Do | 1-(2',3'-hydroxynaphthoylamino)-naphthalene. | Blue-grey | do | Do. |
| Do | 1-(6'-bromo-2',3'-hydroxynaphthoylamino)-2-methoxybenzene. | Greenish blue-grey | do | Dark red violet. |
| Do | 1-(2',3'-hydroxynaphthoylamino)-4-chlorobenzene. | do | do | Violet-grey. |
| Do | 1-(2',3'-hydroxynaphthoylamino)-2,5-dimethoxy-4-chlorobenzene. | Blue-grey | do | Blue-grey. |
| Do | 2-(2',3'-hydroxynaphthoylamino)-naphthalene. | do | Green | Reddish blue-grey. |
| Do | 1-(2',3'-hydroxynaphthoylamino)-2-methoxy-4-chloro-5-methylbenzene. | do | Yellowish green | Do. |
| Do | 1-(2',3'-hydroxynaphthoylamino)-2-methyl-5-chlorobenzene. | Reddish blue-grey | do | Do. |
| Do | 2-(2',3'-hydroxynaphthoylamino)-3-methoxy-diphenylene oxide. | Greenish blue-grey |  |  |
| Do | 1-(2'-hydroxycarbazole-3'-carboylamino)-4-chlorobenzene. |  | Grey | Violet-grey. |
| Do | 1-(2-hydroxyanthracene-3'-carboylamino)-2-methylbenzene. | Green | Brown | Brown. |
| Do | 1-(5'-hydroxy-1',2',1''-benzocarbasole-4'-carboylamino)-4-methoxybenzene. |  | do |  |
| Do | 1-(5'-hydroxy-1',2',1'',2''-benzocarbazole-4'-carboylamino)-2-methyl-4-methoxy-benzene. |  | do |  |
| Do | 1-(6'-methoxy-2',3'-hydroxynaphthoylamino)-2-methoxy-benzene. | Blue green | Yellowish green | Grey. |
| Do | 1-(6'-methoxy-2',3'-hydroxy-naphthoylamino)-2-methyl-5-chlorobenzene. | do | do | Blue-grey. |
| 3-amino-indazol 6-carboxylic acid-amide | 2,3-hydroxynaphthoylaminobenzene | Blue-grey | Green | Violet-grey. |
| Do | 1-(2',3'-hydroxynaphthoylamino)-2-methylbenzene. | do | do | Dull violet. |
| Do | 1-(2',3'-hydroxynaphthoylamino)-2-methoxybenzene. | do | do | Do. |
| Do | 1-(2',3'-hydroxynaphthoylamino)-4-methoxybenzene. | do | do | Do. |
| Do | 1-(2',3'-hydroxynaphthoylamino)-2-methyl-4-methoxybenzene. | do | do | Violet-grey. |
| Do | 1-(2',3'-hydroxynaphthoylamino)-2,5-dimethoxybenzene. | do | do | Dull violet. |
| Do | 1-(2',3'-hydroxynapthoylamino)-4-ethoxybenzene. | do | do | Do. |
| Do | 1-(2',3'-hydroxynapthoylamino)-3-nitrobenzene. | do | do | Do. |
| Do | 1-(2',3'-hydroxynaphthoylamino)-2-methyl-4-chlorobenzene. | do | do | Violet-gray. |
| Do | 1-(2',3'-hydroxynaphthoylamino)-2-methoxy-5-chlorobenzene. | do | do | Dull violet. |

| Diazo component | Coupling component | Copper complex | Cobalt complex | Nickel complex |
| --- | --- | --- | --- | --- |
| 3-amino-indazol 6-carboxylic acid-amide. | 1-(2',3'-hydroxynaphthoylamino)-2-4-dimethoxy-5-chlorobenzene. | Blue-grey | Green | Dull violet. |
| Do | 1-(2',3'-hydroxynaphthoylamino)-naphthalene. | do | do | Do. |
| Do | 1-(6'-bromo-2',3'-hydroxynaphthoylamino)-2-methoxybenzene. | do | do | Do. |
| Do | 1-(2',3'-hydroxynaphthoylamino)-4-chlorobenzene. | do | do | Do. |
| Do | 1-(2',3'-hydroxynaphthoylamino)-2,5-dimethoxy-4-chlorobenzene. | do | do | Do. |
| Do | 2-(2',3'-hydroxynaphthoylamino)-naphthalene. | do | do | Do. |
| Do | 1-(2',3'-hydroxynaphthoylamino)-2-methoxy-4-chloro-5-methylbenzene. | do | do | Do. |
| Do | 1-(2',3'-hydroxynaphthoylamino)-2-methyl-5-chlorobenzene. | do | do | Do. |
| Do | 2-(2',3'-hydroxynaphthoylamino)-3-methoxy-diphenylene oxide. | do | do | Do. |
| Do | 1-(2'-hydroxycarbazole-3'-carboylamino)-4-chlorobenzene. | Reddish dark brown | Grey | Dark green. |
| Do | 1-(2-hydroxyanthracene-3'-carboylamino)-2-methylbenzene. | Green | Yellowish green | Greenish blue-grey. |
| Do | 1-(6'-methoxy-2',3'-hydroxynaphthoylamino)-2-methoxybenzene. | Blue-green | do | Do. |
| Do | 1-(6'-methoxy-2',3'hydroxynaphthoylamino)-2-methyl-5-chlorobenzene. | do | do | Do. |
| Do | 1-(2',3'-hydroxynaphthoylamino)-2,4-dimethylbenzene. | Grey-blue | Green | Violet-grey. |
| Do | 1-(2',3'-hydroxynaphthoylamino)-2-3-dimethylbenzene. | do | do | Do. |
| Do | 2-(2',3'-hydroxynaphthoylamino)-naphthoylamino)-naphthalene. | Greenish blue-grey | do | Dark violet. |
| 3-amino-5-methylsulfonyl-indazol. | 1-(2',3'-hydroxynaphthoylamino)-naphthalene. | Blue-grey | do | Do. |
| Do | 1-(2',3'-hydroxynaphthoylamino)-2-methyl-4-chloro benzene. | Greenish blue-grey | do | Violet-grey. |
| Do | 1-(2',3'-hydroxynaphthoylamino)-2,5-dimethoxybenzene. | do | do | Dark violet. |
| Do | 1-(2',3'-hydroxynaphthoylamino)-2,4-dimethoxy-5-chlorobenzene. | do | do | Do. |
| Do | 1-(2'-hydroxycarbazole-3'-carboylamino)-4-chlorobenzene. | Weak grey | Grey | Do. |
| Do | 1-(2'-hydroxyanthracene-3'-carboylamino)-2-methyl-benzene. | Green | Yellow-green | Olive-grey. |
| Do | 1-(6'-bromo-2',3'-hydroxynaphthoylamino)-2-methoxy-benzene. | Greenish blue-green | Green | Dark violet. |
| 3-amino-5-benzoylamino-indazol. | 2-(2',3'-hydroxynaphthoylamino)-naphthalene. | Reddish grey | Bluish olive green | Do. |
| Do | 1-(2',3'-hydroxynaphthoylamino)-naphthalene. | do | do | Dull violet. |
| Do | 1-(2',3'-hydroxynaphthoylamino)-2-methyl-4-chlorobenzene. | do | do | Do. |
| Do | 1-(2',3'-hydroxynaphthoylamino)-2,4-dimethoxy-5-chlorobenzene. | Greenish blue-grey | do | Do. |
| Do | 1-(2',3'-hydroxynaphthoylamino)-2,5-dimethoxy-benzene. | do | do | Do. |
| Do | 1-(2'-hydroxycarbazole-3'-carboylamino)-4-chlorobenzene. | Violet-grey | Grey | Dark violet. |
| Do | 1-(2'-hydroxyanthracene-3'-carboylamino)-2-methylbenzene. | Yellowish green | Yellow olive green | Green-grey. |
| Do | 1-(6'-bromo-2',3'-hydroxynaphthoylamino)-2-methoxybenzene. | Greenish blue-grey | Bluish olive green | Dull bluish-violet. |

We claim:
1. The complex metal compounds selected from the group consisting of cobalt, copper and nickel compounds of water-insoluble azo-dyestuffs of the following general formula

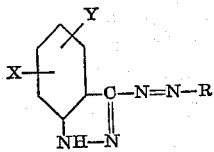

wherein X represents a member selected from the group consisting of hydrogen, chlorine, trifluoromethyl, nitro, methyl, methoxy, ethoxy, sulfonic acid diethylamide, carboxylic acid amide, methylsulfonyl and benzoylamino, Y represents a member selected from the group consisting of hydrogen and methoxy, and R represents a member selected from the group consisting of an arylamide of the benzene, naphthalene, diphenyl and diphenylene oxide series of 2,3-hydroxynaphthoic acid, 6-bromo-2,3-hydroxynaphthoic acid, 6-methoxy-2,3-hydroxynaphthoic acid, 1-hydroxy-4-methylbenzene-2-carboxylic acid, 1-hydroxy-4,5-dichlorobenzene-2-carboxylic acid, 4-hydroxydiphenyl-3-carboxylic acid, 2-hydroxyanthracene-3-carboxylic acid, 2-hydroxycarbazole-3-carboxylic acid, 5-hydroxy-1,2,1',2'-benzocarbazole-4-carboxylic acid and terephthaloyl-bis-acetic acid.

2. The complex metal compounds as claimed in claim 1 wherein R represents an arylamide of the benzene, naphthalene, diphenyl, and diphenylene oxide series of 2,3-hydroxynaphthoic acid.

3. The complex cobalt compound of the azo-dyestuff of the following formula

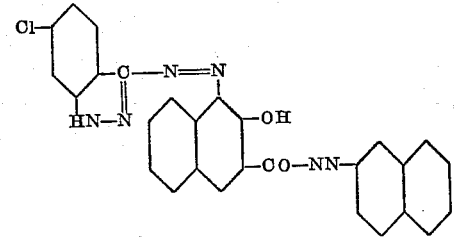

4. The complex cobalt compound of the azo-dyestuff of the following formula

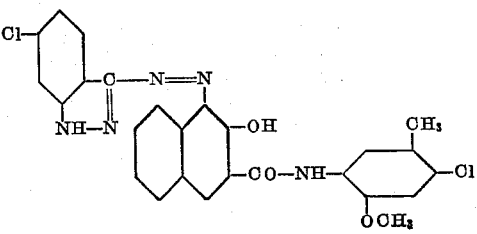

5. The complex cobalt compound of the azo-dyestuff of the following formula
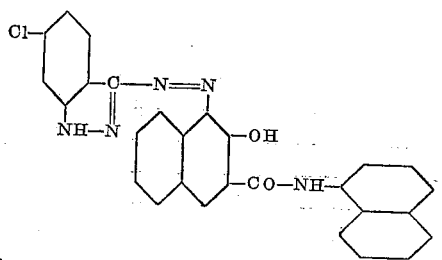
6. The complex cobalt compound of the azo-dyestuff of the following formula
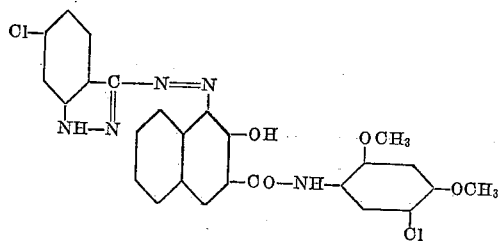
7. The complex cobalt compound of the azo-dyestuff of the following formula
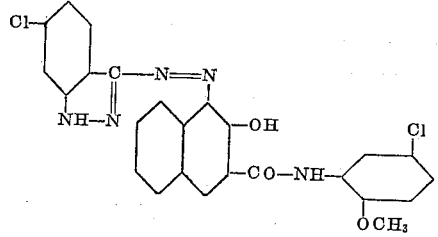
References Cited in the file of this patent
UNITED STATES PATENTS
| | | |
|---|---|---|
| 2,544,936 | Petitcolas et al. | Mar. 13, 1951 |
| 2,883,373 | Bossard et al. | Apr. 21, 1959 |
FOREIGN PATENTS
| | | |
|---|---|---|
| 981,432 | France | May 25, 1951 |